United States Patent [19]

Wallace

[11] Patent Number: 4,669,824

[45] Date of Patent: Jun. 2, 1987

[54] RING STRUCTURE FOR DETACHABLY MOUNTING LIGHT DIFFUSION DISK ON LENS BARREL OF CAMERA

[76] Inventor: George A. Wallace, 13695 Uvas Rd., Morgan Hill, Calif. 95037

[21] Appl. No.: 594,127

[22] Filed: Mar. 28, 1984

[51] Int. Cl.⁴ .............................................. G02B 7/02
[52] U.S. Cl. ..................................... 350/321; 350/318
[58] Field of Search .............. 350/318, 321, 252, 245, 350/433, 431, 434, 247; 248/74.1, 74.2, 74.3, 359 R, 359.1

[56] References Cited

U.S. PATENT DOCUMENTS

| 2,039,709 | 5/1936 | Crumrine | 350/247 |
|---|---|---|---|
| 2,147,482 | 2/1939 | Butler | 350/318 |
| 3,696,238 | 10/1972 | Szymanski | 350/318 |
| 4,427,265 | 1/1984 | Suzuki et al. | 350/321 |

FOREIGN PATENT DOCUMENTS 754890  2/1933  France ................................ 350/321

Primary Examiner—John K. Corbin
Assistant Examiner—Loha Ben
Attorney, Agent, or Firm—John J. Leavitt

[57] ABSTRACT

Presented is an elastically deformable ring structure useful to effect the detachable mounting of a lens cap, filter, or light diffusion disk on the cylindrical lens barrel of a camera. The ring structure is elastically deformable from a non-cylindrical or non-circular configuration to a substantially cylindrical or circular configuration whereby the inherent resilience of the ring structure when mounted on the cylindrical lens barrel retains the ring structure in proper position detachably attached to the lens barrel.

23 Claims, 11 Drawing Figures

RING STRUCTURE FOR DETACHABLY
MOUNTING LIGHT DIFFUSION DISK ON LENS
BARREL OF CAMERA

BACKGROUND OF THE INVENTION

1. Field of the Invention

This invention relates to mounting rings, and particularly to an elastically deformable mounting ring for detachable attachment to a cylindrical supporting object. The mounting ring will be explained in terms of its application to support a light diffusion disk on the cylindrical lens barrel of a camera, however, it should be understood that the mounting ring structure of the invention has application in other areas.

2. Description of the Prior Art

With respect to diffusion disks in general, as they apply to cameras, reference is made to U.S. Pat. No. 4,381,890 and the prior art cited therein. Reference is also made to Design Pat. No. D-270-069 directed to the design of a diffusion disk for application to cameras. Both of these patents were issued to the inventor of the instant invention.

A preliminary patentability search has not been conducted on the concept of an elastically deformable non-circular ring structure for application to cylindrical objects. Accordingly, applicant is unaware of any prior art applicable to this concept.

There are many different instances in ordinary living situations where it is necessary or desirable to attach a relatively wide lid or cover with very little depth detachably to a short section of cylindrical supporting structure. One such instance that comes to mind and which is readily understood by the public in general because of its wide use, is the means for sealing an open coffee can. After the metallic end of the can which preserves the vacuum tightness of the can is removed so as to permit access to the coffee in the can, a circular plastic lid is forced over the open end of the can to seal the can. This is accomplished by compressing a bead on the outer periphery of the can and stretching a bead on the inner periphery of a cylindrical flange formed on the circular plastic lid. The proportions of the beads and the dimensions of the can and lid are such that the bead on the plastic flange may be forced over the bead on the end of the can, thus preventing inadvertent detachment of the lid while permitting it to be pulled free of the can to have access to the coffee.

In U.S. Pat. No. 4,381,890 referred to above, diffusion disks having attachment means in the nature of threads on either the inner or outer periphery of a circular flange have been illustrated, and such attachment means in an appropriate case are very useful. However, they pose problems related to manufacture, costs and cross-threading in use.

It is an object of the present invention to provide a ring structure which is configured in such a way as to be elastically deformable from a non-circular, non-cylindrical configuration to a substantially circular or cylindrical configuration so that when applied to a cylindrical supporting object, the mounting ring will be deformed and retained thereon by the inherent elasticity of the ring and its normal tendency to return to its non-circular configuration.

Another object of the invention is the provision of a mounting ring of non-circular configuration which will accept a circular disk or filter or lens cap and retain the disk floatingly trapped in proper position while permitting elastic flexure of the ring from a non-circular configuration to a circular configuration without releasing the circular disk, filter or lens cap.

A still further object of the invention is the provision of a light diffusion assembly for mounting on the lens barrel of a camera, the assembly including a mounting ring having a flange portion that is non-circular in its relaxed configuration and which is elastically deformed into a substantially circular configuration when applied to the lens barrel of a camera.

A further object of the invention is the provision of a mounting ring including a mounting portion in the form of a flange one or both of the peripheries of which are non-circular in configuration and are elastically deformable into a substantially circular configuration.

The invention possesses other objects and features of advantage, some of which, with the foregoing, will be apparent from the following description and the drawings. It is to be understood however, that the invention is not limited to the embodiment illustrated and described, since it may be embodied in various forms within the scope of the appended claims.

SUMMARY OF THE INVENTION

In terms of broad inclusion, the ring structure incorporating a light diffusion disk for detachable attachment on the lens barrel of a camera, or for use in mounting other objects on cylindrical support structures, comprises in one aspect a ring-like body the outer periphery or the inner periphery or both peripheries of which are formed in a non-circular non-cylindrical configuration so that elastic deformation of the ring-like body to bring it into a substantially circular configuration requires the imposition of a force on the ring-like body which when mounted is exerted against the supporting structure to effectively hold the ring-like body on the support structure. In this aspect of the invention, the ring-like body may be toroidal in its configuration, having inner and outer peripheries one or both of which may be non-circular in its configuration, the inner and outer peripheries being joined by opposite front and rear faces to form a generally toroidal ring-like body possessing elastic deformability. The transverse or diametric dimension of the ring-like body in one plane is greater than the diametric dimension of the ring-like body in a second angularly disposed plane which passes through a common axis.

In the second aspect of the invention, the ring structure is formed by a circular toroidal body from which extends a generally tubular integral flange-like mounting portion, the inner or outer, or both inner and outer peripheries of the flange-like mounting portion being non-circular in configuration while the toroidal body from which the flange-like mounting portion extends is circular. In still another aspect of the invention, the ring-like mounting structure includes a main circular body portion and a tubular flange mounting portion having a non-circular exterior periphery for mounting the ring-like mounting structure on the lens of a camera. The ring structure is also provided with means for diffusing light impinging on one surface of the ring structure, with color compensation means, and with a disk for controlling the amount of light entering the camera, thus providing an effective light diffusion disk for application on the lens barrel of a camera equipped with an internal light metering system.

DESCRIPTION OF THE PREFERRED EMBODIMENTS

Figure 2:
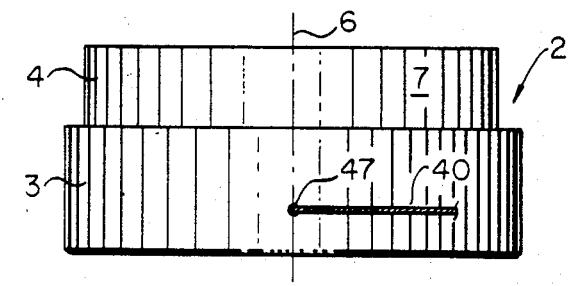
FIG. 2 is an edge view of the structure illustrated in FIG. 1.
Figure 1:
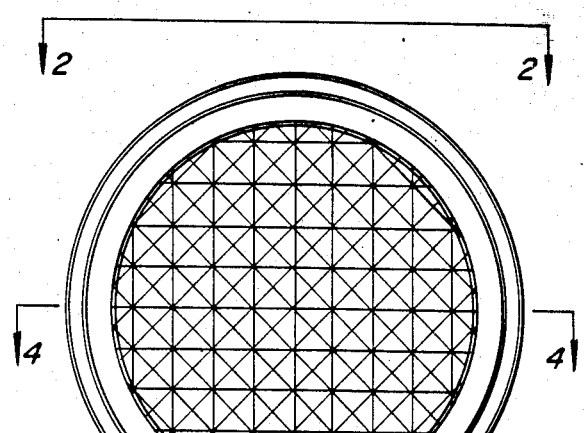
FIG. 1 is a front elevational view of the invention embodied in a light diffusion disk for cameras.

In terms of greater detail, the ring structure forming a part of a light diffusion disk and for detachably mounting a filter or light diffusion disk on a tubular cylindrical lens barrel of a camera, or incorporated into other devices for mounting such other devices on cylindrical support structures, comprises a ring structure designated generally by the numeral 2, as viewed in FIGS. 1 and 2, the ring structure including a body portion 3 and a mounting flange portion 4, integral with the body portion and initially being coaxially disposed with respect to the body portion. Both the body portion and the mounting flange portion are initially coaxially disposed about a central axis 6 and are modified, as will hereinafter be described, to provide the mounting flange portion with a non-circular exterior periphery 7, and/or a non-circular inner periphery 8 in a manner which will hereinafter be explained.

Figure 4:
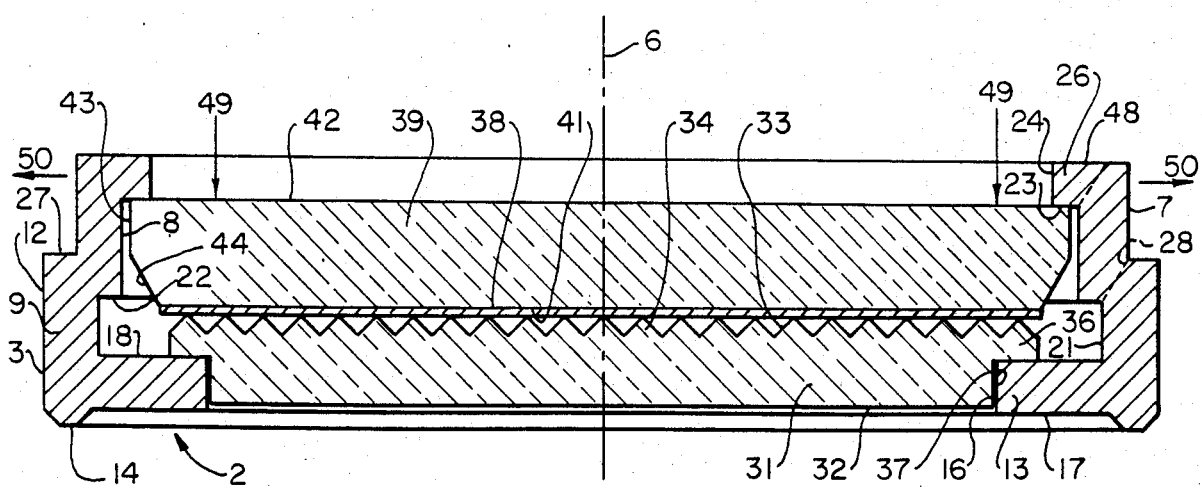
FIG. 4 is a cross sectional view taken in the plane indicated by the line 4—4 in FIG. 1.

Referring to FIG. 4, it will be seen that the body portion 3 of the ring structure includes a generally cylindrical portion 9 having an outer periphery 12, conveniently knurled to facilitate digital manipulation, and on one end being provided with a radially inwardly extending flange 13, the flange 13 being integral with the cylindrical portion 9 of the body 3, and being circumscribed by a short cylindrical flange or bead 14 as illustrated, which may be considered to be a short extension of the cylindrical wall portion 9.

Figure 3:
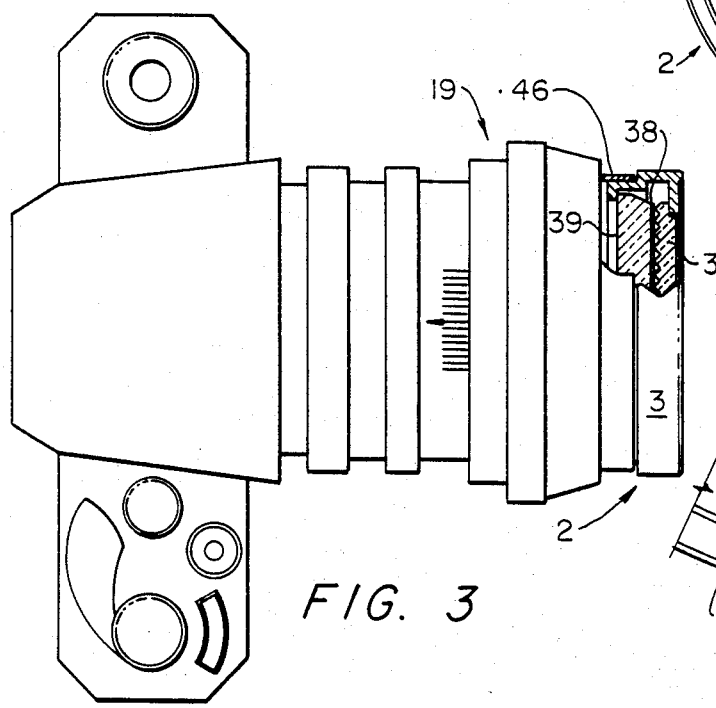
FIG. 3 is an elevational view illustrating the light diffusion disk mounted on a camera lens barrel.
Figure 5:
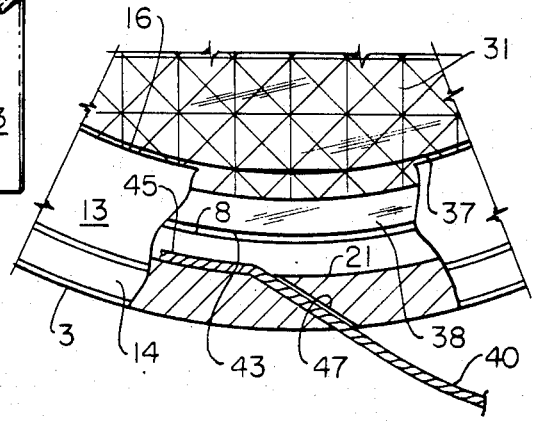
FIG. 5 is a fragmentary sectional view illustrating the method of attachment of the pull cord to the light diffusion disk assembly.

The radially extending flange 13 is provided with an inner peripheral surface 16, a front face 17, and a rear face 18, the rear face 18 joining the inner peripheral surface 16 and the front face 17 to define a circular aperture through which light is admitted to the lens (not shown) mounted within a lens mounting structure designated generally by the numeral 19 in FIG. 3. As illustrated in FIG. 4, the cylindrical wall portion 9 of the body portion 3 is recessed radially outwardly to provide an inner peripheral surface 21 that is substantially perpendicular to the rear face 18 of the flange 13, the inner peripheral surface 21 being generally cylindrical and circular and symmetrical about the longitudinal or central axis 6.

The inner peripheral surface 21 of the cylindrical body portion 9 is interrupted by a shoulder 22 defining an annular surface spaced from rear face 18 of flange 13, and lying substantially parallel thereto. The surface 22 is in turn interrupted by the inner peripheral surface 8 of the mounting flange 4. This inner peripheral surface 8 extends generally axially away from the flange rear surface 18, and is interrupted by a radially extending surface 23 which forms a shoulder defining the outer extremity of the inner peripheral surface 8, defined between the shoulders 22 and 23 as illustrated. The inner peripheral dimension of the shoulder 23 on mounting flange 4 is defined by the inner peripheral surface 24 of the end portion 26 of the mounting ring structure, and this inner peripheral surface 24, which is coaxially disposed about the central axis, and is circular in configuration, cooperates with the shoulder 23 in a way which will hereinafter be explained.

Additionally, it should be noted that between the circular peripheral surface 12 of the body 3, and the outer non-circular peripheral surface 7 of the mounting flange 4, there is a shoulder 27 which has the effect of reducing the diameter dimensions of the outer peripheral surface 7 to something less than the diameter of the cylindrical outer peripheral surface 12 of the main body. In like manner, the inner peripheral surface 8 of the mounting flange 4 is less in its diameter than the diameter of the inner peripheral surface 21, thus modifying the configuration of the cylindrical portion 9 of the body and the mounting flange portion 4 of the mounting ring to provide the equivalent of a "live" hinge 28 between the root of the shoulder 22 and the root of the shoulder 27. Thus, when a radially outwardly directed force is imposed on the surface 24 during assembly, the mounting flange portion 4 tends to elastically flex outwardly, with the live hinge 28 functioning as the turning or pivot point for the flange. During such flexure, which will hereinafter be explained, the mounting flange 4 assumes a substantially truncated conical configuration, with the small base in the area of the live hinge 28, and the major or large base defined by the end portion 26.

The cylindrical wall portion 9 and the non-circular mounting flange portion 7 are thus integrally formed to receive the remaining parts of the assembly, which in this instance include a circular diffusion plate or disk 31 having a front face 32 and a rear face 33 having prism-like projections 34 formed therein to disperse light striking the front face of the diffusion disk. The diffusion disk is fabricated from a suitable plastic material and is dropped into the central aperture defined by the inner peripheral surface 16 of flange 13 so that the radially outwardly projecting flange portion 36 of the diffusion disk rests on the inner surface 18 of the flange 13, while the cylindrical outer peripheral surface 37 of the diffusion disk 31 forms a snug slip fit with the surface 16 of flange 13.

Superimposed on the diffusion disk 31, so that it lies in contact with the apex ends of the prism-shaped members 34, is a color compensation disk 38, preferably fabricated from a light gauge plastic material having the appropriate formulation to filter the light that strikes the front face 32 of the diffusion disk 31, impeding excessive amount of such light as would produce an unwanted color. In this way, the amount of any color being passed to the film in the camera may be modified or not, as desired, within very close limits.

Superimposed on the color compensation filter 38 is a translucent filter plate or disk 39, circular in configuration, having a front face 41 which lies against the top surface of the color compensation filter 38 and in contiguous contact therewith, and having a rear face 42 from which light passes directly to the lens system of the camera. The translucent filter disk 39 possesses a circular outer peripheral surface 43 and a truncated conical configured peripheral surface portion 44 as illustrated.

Figure 7:
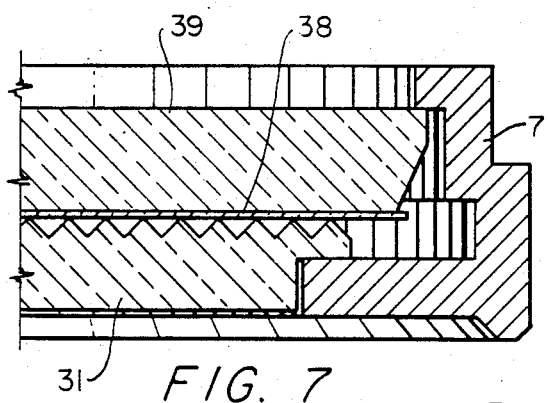
FIG. 7 is a view similar to FIG. 6, but showing the parts in final assembled position.
Figure 6:
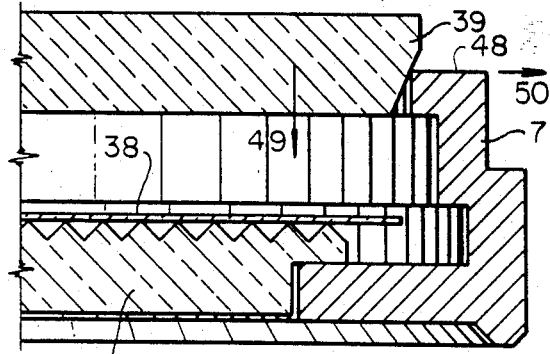
FIG. 6 is a fragmentary sectional view in enlarged scale illustrating the method of assembly of the parts of the light diffusion disk.
Figure 8:
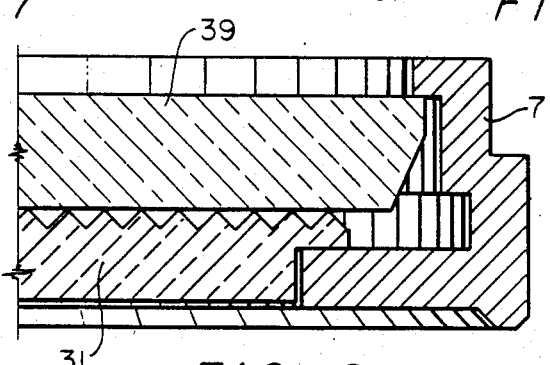
FIG. 8 illustrates a modified embodiment of the structure illustrated in FIGS. 6 and 7, the modification comprising the omission of the color compensation filter member.

During the assembly procedure, the ring structure 3 is supported on the bead 14 on an appropriate work surface (not shown). The terminal end 45 of the pull cord 40 is inserted through the tangentially directed aperture 47 so that the end portion lies in the recess defined by the inner peripheral surface 21, the shoulder 22 and the inner surface 18 of the flange 13. A drop of adhesive on the end 45 permanently adheres the end within the assembly, while the remainder of the pull cord 40 extends from the assembly. Next the diffusion disk 31 is dropped into place, as previously described, followed by the color compensation disk 38. Thereafter, as shown in FIG. 6, the disk 39 is placed on the ring so that the conical surface 44 engages the corner formed between circular surface 24 and the extreme end surface 48 of the mounting flange. Downward pressure is then applied in the direction of the arrows 49, resulting in a component of that pressure being exerted radially outwardly by the camming action of the conical surface 44. This causes the end portion 26 of the flange 4 to be elastically deformed radially outwardly in the direction of the arrow 50 to a greater diameter, permitting the circular peripheral face 43 of disk 39 to slip past circular peripheral surface 24. When the rear face 42 of disk 39 slips past the shoulder 23, the end portion 26 will recover its original position (FIG. 7), trapping the disk 39 behind the shoulder as shown, but accommodating radial displacement of the disk 39 in relation to the supporting flange 4.

It is the function of the translucent filter disk 39 to control the quantity of light passing through the ring structure and being admitted to the light metering system of the camera through the lens. As explained in U.S. Pat. No. 4,381,890 issued to the inventor hereof, the filter disk 39 is fabricated from an appropriate synthetic resinous material or plastic formulated to pass a predetermined amount of light that impinges on the front face 32 of the light diffusion disk structure, so that the amount of light being admitted into the camera correlates to the light metering system incorporated in most single lens reflex cameras.

To effectively retain the ring structure on the inner periphery of the lens barrel as indicated in FIG. 3, the outer peripheral surface 7 of the mounting flange 4 is formed in a non-circular configuration so that when it is applied to the circular inner periphery of the lens barrel, which includes the cylindrical mounting flange 46, the inner periphery of which is circular, the non-circular outer periphery of the mounting flange 4 of the light diffusion disk conforms itself to the circular configuration of the inner periphery of the flange 46, causing elastic deformation of the mounting flange 4, such elastic deformation effecting a radially outwardly directed force against the inner periphery of the mounting flange 46, thus snugly retaining the light diffusion disk detachably mounted on the lens barrel.

Figure 9:
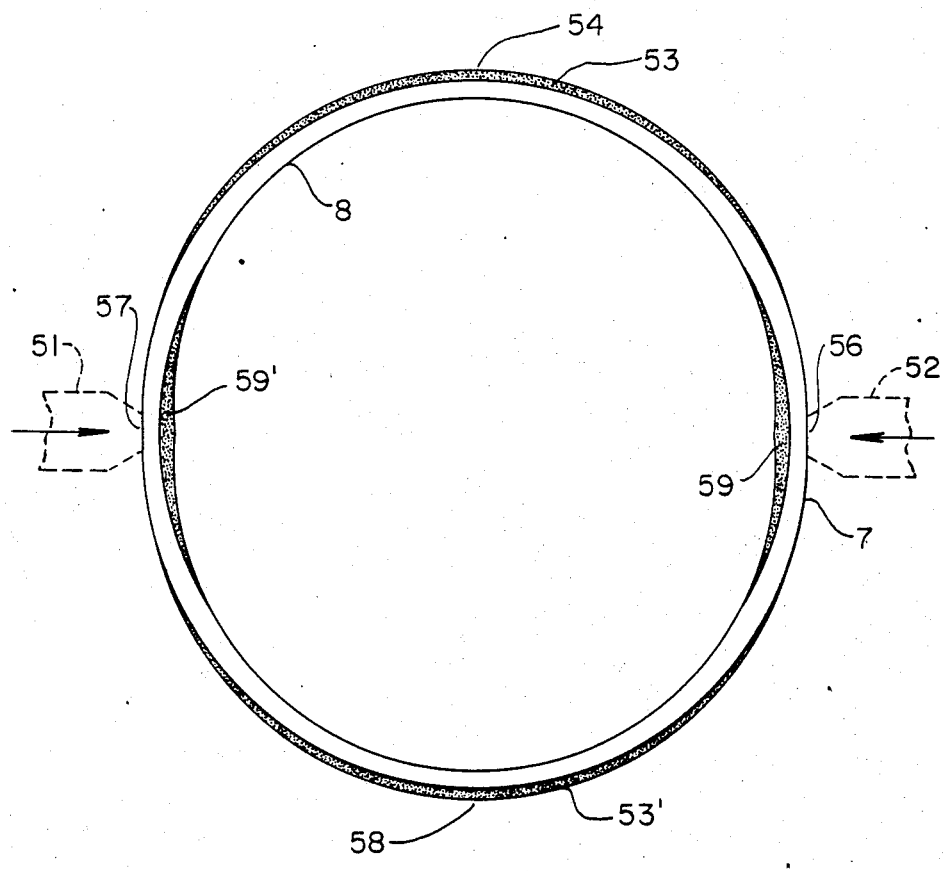
FIG. 9 is an elevational end view of the mounting flange portion of the light diffusion disk illustrated in FIGS. 1 and 2, illustrating the method of converting the initially tubular cylindrical mounting flange into a tubular body in which the inner and outer peripheries are generally oval.
Figure 10:
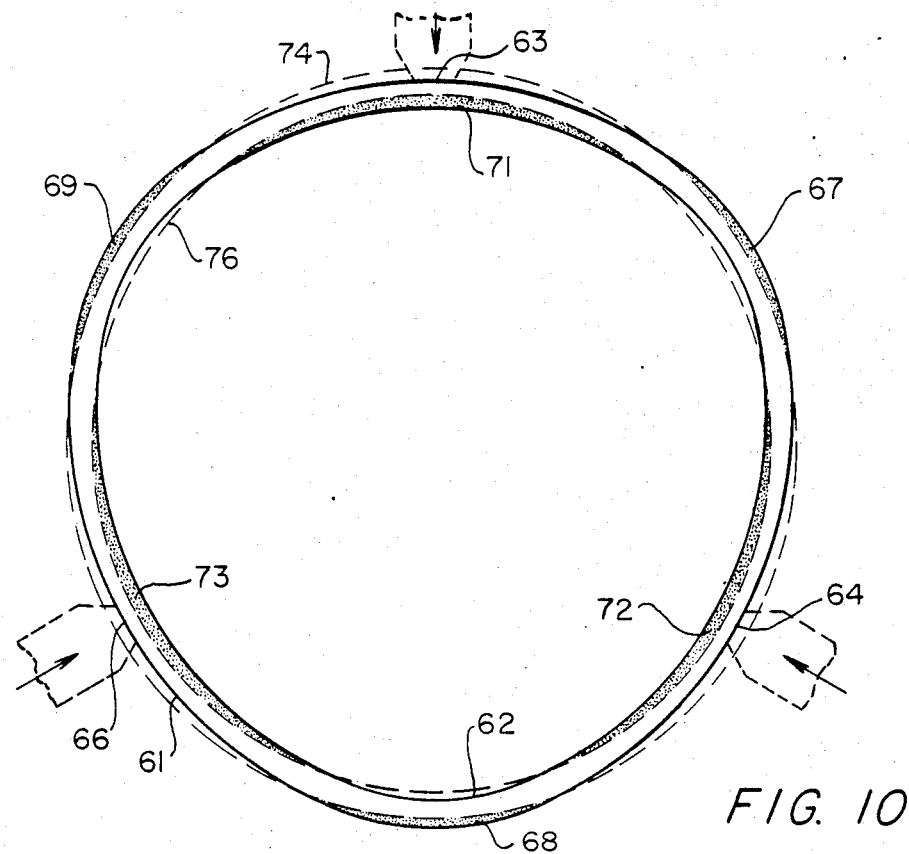
FIG. 10 is a view similar to FIG. 9 but showing the initially tubular cylindrical flange body of the light diffusion disk of FIGS. 1 and 2 modified in its configuration to provide three areas around its inner and outer peripheries which lie at greater distances from the central axis then the intervening portions.
Figure 11:
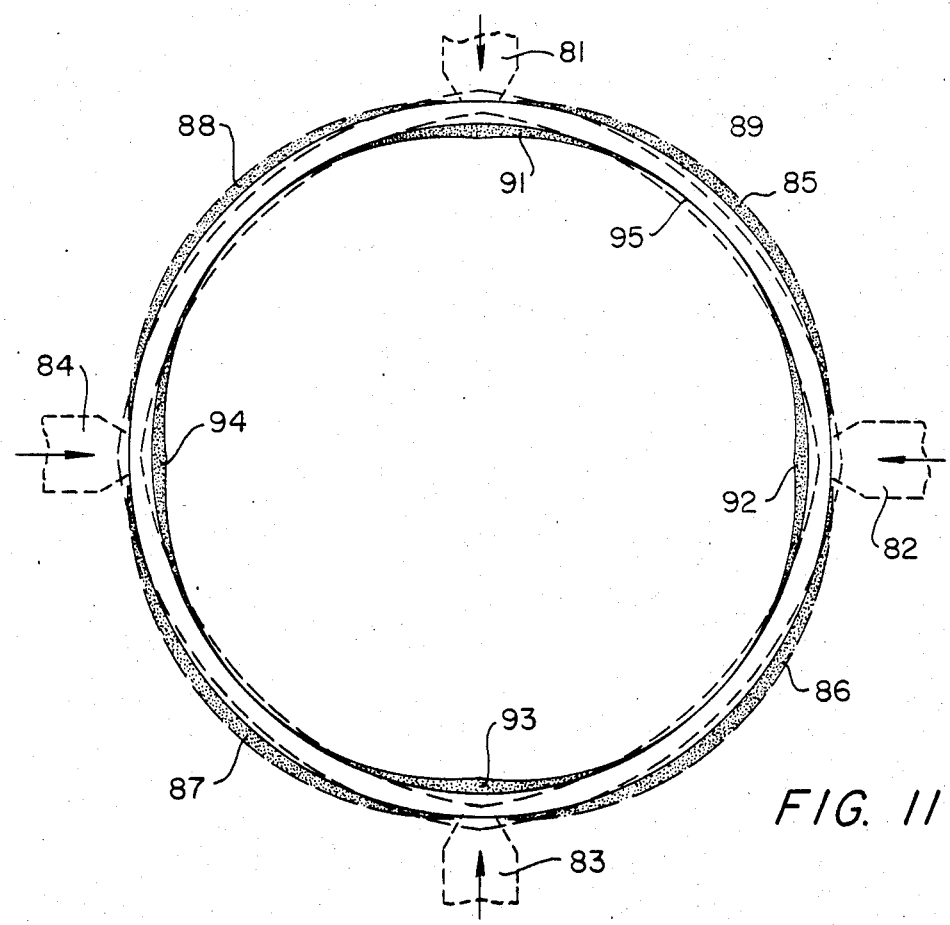
FIG. 11 is a view similar to FIGS. 9 and 10, but illustrating an embodiment in which the initially tubular circular configuration of the mounting flange portion of the light diffusion disk of FIGS. 1 and 2 has been modified to provide four surface portions on the inner and outer peripheries of the flange which lie at different distances from the central axis than the intervening portions.

As illustrated in FIGS. 9, 10 and 11, there are several configurations of non-circular mounting flanges 4 that will function in the manner described to retain the light diffusion disk detachably mounted on the lens barrel. There follows an explanation of one method of achieving these different configurations. Referring to FIG. 9, in this embodiment of the invention, the ring structure having outer peripheral surface 7 and inner peripheral surface 8, both being initially circular and symmetrical about the central axis of the mounting ring, is mounted in a two-jaw lathe chuck as illustrated in broken lines at 51 and 52. This is done prior to the mounting in such ring structure of the diffusion plate 31, the color compensation filter 38 and the disk 39. After mounting, the chuck is closed down to impose radially inwardly directed forces against the outer peripheral surface 7 of the mounting flange portion 4, effecting about 0.010" radially inwardly directed displacement of the peripheral surfaces 7 and 8. The displacement may be more or less, depending on the application. Thus, the horizontal transverse dimension of the 15 inner and outer peripheral surfaces are diminished by 0.020" in the horizontal plane, and since the ring is elastic in its characteristic, the dimension of the ring in the vertical plane increases by 0.020", i.e., 0.010" at diametrically opposed sides of the ring, generating an oval configuration. Next, the amount by which the diametrical dimension in the vertical plane was increated (0.020") is machined from the outer periphery 7 as illustrated by the stippled portions 53 and 53' in FIG. 9. The effect of this operation is that the oval configuration of the outer peripheral surface 7 of the ring is converted back to a substantially circular configuration because the amount of material that is cut from the outer peripheral surface of the ring is maximum at the 12 o'clock position as referenced by the numeral 54 and tapers down to zero adjacent the horizontal plane which passes through the 3 o'clock and 9 o'clock positions designated by the numerals 56 and 57 respectively. The same cut is of course made on the bottom half of the ring, the major depth of cut occuring at 58, which is equivalent to the 6 o'clock position while the thickness of the cut tapers to zero adjacent 56 and 57 as previously discussed.

It will of course be understood that while the outer peripheral surface 7 of the mounting flange 4 after these cuts are made and while still held in the chuck will be substantially circular, the inner peripheral surface 8 of the mounting flange 4 still retains its oval configuration. Accordingly, to provide for greater deformation of the mounting flange 4 so that it may accommodate a greater range of inner diameters of the mounting flange 46 of the lens barrel, another cut is made on the inner periphery 8 of the ring, the tool cutting 0.010" from the inner periphery with the thickest portions 59 and 59' of the cut being at the 3 o'clock and 9 o'clock positions, i.e., opposite reference numbers 56 and 57, respectively, with the depth of the cut tapering to zero adjacent the 12 o'clock and 6 o'clock positions.

The effect of this cut is to render the inner peripheral surface 8 of the ring substantially circular in its configuration so long as it is being held compressed by the chuck jaws. After these cuts have been made, when the ring is released from the pressure imposed by the jaws 51 and 52 of the chuck, the inherent or natural elasticity of the body will cause the ring to spring outwardly at 56 and 57 along the horizontal plane, and this will have the effect of drawing the previously distended portions of the ring at 12 o'clock and 6 o'clock inwardly toward the central axis, resulting in both the inner and outer peripheries of the mounting flange portion 4 or the ring to now be substantially oval or elliptical.

Thus, when the mounting flange 4 thus configured is applied to the inner circular periphery of the mounting flange 46 of the lens barrel, the slight amount of force that is impressed on the ring to mount it causes the mounting flange 4 to be elastically deformed into a circular configuration to conform to the inner periphery of the mounting flange 46. In so conforming to a circular configuration, the mounting flange 4, with its normally non-circular outer peripheral surface 7, is caused to push radially outwardly against the inner periphery of the mounting flange 46 to thus detachably retain the mounting ring on the lens barrel.

It will of course be understood that while I have described the formation of the non-circular configuration of the mounting flange 4 as being effected on a lathe, the configuration sought may also be achieved by injection molding of the plastic into a suitably configured mold. The end result sought is of course a non-circular configuration, whether it be the outer periphery, the inner periphery or both the inner and outer peripheries of the mounting flange portion 4 of the ring, so that when applied to the inner or outer peripheries of appropriately sized supporting cylindrical structures, the inherent elasticity of the body will cause the body when forced into a circular configuration, to snugly engage such circular configuration of the supporting body.

Referring to FIG. 10, the mounting flange 4 of the light diffusion disk assembly is illustrated as being noncircular and having three circumferentially spaced peripheral portions that are spaced from the central axis at distances greater than the distance of adjoining portions of the periphery. As before, this non-circular configuration of the outer peripheral surface 7, or the inner peripheral surface 8, or both the inner and outer surfaces 7 and 8, may be achieved by machining the ring structure in an appropriate lathe.

Thus, to achieve this 3-lobe non-circular configuration, the ring structure is mounted in a three-jaw chuck. The three jaws of the chuck are tightened on the ring to elastically deform the mounting flange 4, which is initially circular and concentric with the cylindrical wall 9 of the body 3, into a 3-lobe configuration illustrated by the full lines 61 and 62 designating the outer and inner peripheries 7 and 8, respectively. Note that the jaws of the chuck move radially inwardly approximately 0.010" at their points of contact at 63 (12 o'clock), 64 (4 o'clock) and 66 (8 o'clock). These pressure points and displaced areas are thus spaced 120° circumferentially about the peripheries 7 and 8. Since the ring structure is not compressible in the sense that the material from which the ring is fabricated will become more dense from such pressure, the application of pressure causes displacement of the peripheral areas inwardly at the pressure points, thus causing the intermediate portions 67, 68 and 69 of the mounting flange 4 to bulge outwardly between the pressure points an amount (0.010") substantially equal to the amount of inward displacement at the pressure points rather than to compress circumferentially. Circumferentially spaced undulated inner and outer peripheral surfaces are thus provided the clamped ring so long as it remains clamped in the 3-jaw chuck.

With respect to the undulated inner peripheral surface designated by the full line 62, note that opposite the pressure points 63, 64 and 66 there are arcuate portions 71, 72 and 73 of the flange 4 that are displaced inwardly approximately 0.015" at the point of maximum displacement, with the degree of displacement tapering off to zero on both sides of the point of application of the pressure. With the ring structure thus clamped within the three jaws of the chuck, a cut is made on the exterior periphery along the broken line 74, resulting in removing from the wall thickness of the mounting flange 4 the protruding intermediate portions 67, 68 and 69 shown by stippling in FIG. 10. In like manner, while the ring structure is held in deformed condition, a cut is made on the inner periphery along the broken line 76, resulting in removing from the wall thickness of the mounting flange 4 the inwardly displaced portions of the wall designated by reference numbers 71, 72 and 73. Note that these arcuate portions, shown by stippling, are oriented opposite each pressure point, while the portions 67, 68 and 69 are oriented circumferentially spaced from the portions 71, 72 and 73.

The effect of these two cuts is to convert the stressed mounting flange 4, while held in the chuck, back into a substantially circular configuration. But since this substantially circular configuration is maintained by the continued application of pressure at points 63, 64 and 66, it will be seen that when the ring structure is released from the chuck and the pressure relieved, the mounting flange 4 will revert to a non-circular configuration. The flange wall portions at 63, 64 and 66 will spring outwardly and the wall portions from which the protuberances 67, 68 and 69 were removed will move inwardly, so that undulated inner and outer peripheries will again be formed. It is important to note that the peripheral inner and outer surfaces, while being non-circular, are substantially parallel, resulting in a flange wall 4 of substantially uniform thickness but undulating circumferentially to provide three lobes on the outer periphery and the same number of lobes on the inner periphery. Note however that the lobes on the inner and outer peripheries are circumferentially angularly displaced, the lobes on the outer periphery occurring at 63, 64 and 66, while the lobes on the inner periphery occur at points opposite portions 67, 68 and 69.

When the mounting flange 4 of the ring structure, configured as in FIG. 10, is applied to the tubular cylindrical lens barrel flange 46, the outer peripheral lobes will be pressed inwardly by contact with the inner periphery of the flange 46, causing the flange 4 to be elastically strained into a circular configuration conforming to the inner periphery of the flange 46. The force required to effect the elastic deformation is the force that retains the ring structure detachably attached to the flange 46.

FIG. 11 illustrates a third embodiment of the mounting flange 4 formed into a non-circular configuration in the same manner as discussed above in connection with FIG. 10. The difference is that in FIG. 11 a four-jaw chuck is used to effect the elastic deformation, the jaws 81, 82, 83 and 84 moving inwardly, displacing the initially circular periphery to effect elastic deformation and the formation of four protuberances on each of the inner and outer peripheries as shown by the stippled areas 85, 86, 87 and 88 associated with the outer periphery illustrated by the full line 89, and the stippled areas 91, 92, 93 and 94 associated with the inner periphery illustrated by the full line 95 in FIG. 11.

As before, the protuberances on the inner and outer peripheries are machined off to render a circular configuration while held in the chuck, becoming a non-circular configuration when released by the chuck, as previously described. The mounting flange 4 will now have four radially outwardly protruding lobes that correspond in circumferential position to the positions where inward pressure was applied to effect elastic deformation. Additionally, it will have four radially inwardly protruding lobes on the inner periphery corresponding in circumferential positions to the positions of the protuberances 85, 86, 87 and 88 that were cut from the outer periphery.

While I have described the method of achieving three non-circular configurations as illustrated in FIGS. 9, 10 and 11 through use of a lathe and a machining operation, it should be understood that other methods of achieving a non-circular configuration may be used. For instance, the flange 4 may be injection molded to produce ultimate configurations as illustrated in FIGS. 9, 10 or 11.

It will thus be seen that by configuring the mounting flange to be non-circular, the very act of applying the non-circular flange into the inner periphery of the circular flange 4, causes an elastic deformation of the mounting flange, resulting in a radially directed retention force being applied between the elastically deformable non-circular mounting flange 4 and the cylindrical support structure to which it is applied. It has been found that in general, the greater the angular separation of the peripheral protuberances the greater is the elastic deformability. Thus, the two-lobe embodiment of FIG. 9 has a greater range of motion under the same radially directed force than the embodiments of either FIGS. 10 and 11, and the FIG. 10 embodiment (3-lobes) has a greater range of motion than the FIG. 11 embodiment.

Having thus described the invention, what is believed to be new and novel and sought to be protected by letters patent of the United States is as follows.

I claim:

1. A mounting ring, comprising:
   (a) a generally annular body of elastically deformable material having front and rear faces and inner and outer peripheries spaced radially from a central axis and extending between said front and rear faces to define an aperture;
   (b) selected portions of at least one of said peripheries being radially spaced from said central axis a greater distance than other portions thereof whereby at least one of said peripheries is non-circular;
   (c) said body being proportioned so that pressure applied radially on the body at points on said at least one of said peripheries corresponding to greater radial distances of said non-circular periphery effects elastic deformation of said body and displacement of said at least one of said peripheries into a substantially circular configuration.

2. The combination according to claim 1, in which said outer periphery is non-circular.

3. The combination according to claim 2, in which said inner periphery is non-circular 4. The combination according to claim 1, in which said outer periphery is oval.

5. The combination according to claim 1, in which said inner periphery is oval.

6. The method of forming a mounting ring having elastic deformability for demountable attachment to a cylindrical support member, comprising the steps of:
   (a) forming an annular body having circular inner and outer peripheries coaxially symmetrical about a central axis;
   (b) applying radially directed pressure to a selected one of said peripheries at angularly displaced points on said periphery whereby said initially circular inner and outer peripheries are elastically deformed into a non-circular configuration;
   (c) re-shaping into a circular configuration at least one of said peripheries of said body while said radially directed pressure is maintained; and
   (d) removing said radially directed pressure from said selected one of said peripheries whereby said annular body will return to an unstressed configuration in which at least one periphery is non-circular.

7. The method according to claim 6, in which said radially directed pressure is applied at points on the outer periphery 180° apart.

8. The method according to claim 6, in which said radially directed pressure is applied at points on the outer periphery 120°.

9. The method according to claim 6, in which said radially directed pressure is applied at points on the outer periphery 90° apart.

10. The method according to claims 7, 8 or 9 in which said re-shaping is effected by cutting from at least one periphery of the elastically deformed ring protuberances that extend beyond a predetermined radius.

11. The method according to claims 7, 8 or 9 in which said re-shaping is effected by cutting from both inner and outer peripheries of the elastically deformed ring protuberances that extend beyond a predetermined radius.

12. A mounting ring, comprising:
   (a) a body of elastically deformable material having inner and outer peripheries spaced radially from a central axis to define an aperture;
   (b) selected portions of at least one of said peripheries being radially spaced from said central axis a greater distance than other portions thereof whereby at least one of said peripheries is non-circular;
   (c) said outer periphery being non-circular
   (d) said body being proportioned so that pressure applied radially on the body at points on the outer periphery corresponding to greater radial distances of said non-circular periphery effects elastic deformation of said body and displacement of said outer periphery into a substantially circular configuration.

13. A mounting ring, comprising:
   (a) a body of elastically deformable material having inner and outer peripheries spaced radially from a central axis to define an aperture;

(b) selected portions of at least one of said peripheries being radially spaced from said central axis a greater distance than other portions thereof whereby at least one of said peripheries is non-circular; and (c) said body of elastically deformable material including a front face and a rear face generally perpendicular to said central axis and connecting said inner and outer peripheries, and a ring mounting flange having inner and outer peripheries integral with said rear face adjacent a selected one of said peripheries of said body, said ring mounting flange having selected peripheral portions radially spaced from said central axis a greater distance than other peripheral portions whereby at least one of said peripheries of said flange is non-circular.

14. The combination according to claim 13, in which one of said peripheries of said flange constitutes an axial extension of the associated corresponding periphery of said body.

15. The combination according to claim 13, in which the outer periphery of said flange substantially conforms to the configuration of the inner periphery of said flange.

16. A mounting ring, comprising:

(a) a body of elastically deformable material having inner and outer peripheries spaced radially from a central axis to define an aperture;

(b) selected portions of at least one of said peripheries being radially spaced from said central axis a greater distance than other portions thereof whereby at least one of said peripheries is non-circular; and (c) a disk mounted on said body to close said aperture.

17. The combination according to claim 16, in which said disk is transparent.

18. The combination according to claim 16, in which said disk is opaque.

19. The combination according to claim 16, in which said disk is an image-blocking translucent disk.

20. A mounting ring, comprising:

(a) a body of elastically deformable material having inner and outer peripheries spaced radially from a central axis to define an aperture;

(b) selected portions of at least one of said peripheries being radially spaced from said central axis a greater distance than other portions thereof whereby at least one of said peripheries is non-circular;

(c) said outer periphery being non-circular; and (d) a disk mounted on said body to close said aperture.

21. The combination according to claims 12, 13 or 20, in which a cylindrical support member is provided, and said body is elastically deformed whereby said at least one of said peripheries is deformed to conform to and demountably engage said cylindrical support member.

22. The combination according to claims 12, 16 or 20, in which a camera lens unit is provided, said camera lens unit including a tubular cylindrical portion, and said body is elastically deformable whereby said at least one of said peripheries is deformable to conform to and demountably engages said tubular cylindrical portion of the camera lens unit.

23. A mounting ring, comprising:

(a) a body of elastically deformable material having inner and outer peripheries spaced radially from a central axis to define an aperture;

(b) selected portions of at least one of said peripheries being radially spaced from said central axis a greater distance than other portions thereof whereby at least one of said peripheries is non-circular; and (c) a light dispersing disk mounted on said body, a color compensation disk mounted adjacent said light dispersing disk and adapted to receive light therefrom, and a light diffusion disk mounted on said body adjacent said color compensation disk to diffure light passing through said color compensation disk.

* * * * *